(12) United States Patent
Sawant

(10) Patent No.: US 11,981,188 B2
(45) Date of Patent: May 14, 2024

(54) EXTENDABLE SUN VISOR

(71) Applicant: Volvo Truck Corporation, Gothenburg (SE)

(72) Inventor: Harshad Sawant, Bangalore (IN)

(73) Assignee: Volvo Truck Corporation, Gothenburg (SE)

(*) Notice: Subject to any disclaimer, the term of this patent is extended or adjusted under 35 U.S.C. 154(b) by 234 days.

(21) Appl. No.: 17/762,480

(22) PCT Filed: Sep. 18, 2020

(86) PCT No.: PCT/EP2020/076103
§ 371 (c)(1),
(2) Date: Mar. 22, 2022

(87) PCT Pub. No.: WO2021/069190
PCT Pub. Date: Apr. 15, 2021

(65) Prior Publication Data
US 2022/0348059 A1    Nov. 3, 2022

(30) Foreign Application Priority Data
Oct. 7, 2019 (IN) .............................. 201941040602

(51) Int. Cl.
*B60J 3/02* (2006.01)

(52) U.S. Cl.
CPC ........... *B60J 3/0208* (2013.01); *B60J 3/0278* (2013.01)

(58) Field of Classification Search
None
See application file for complete search history.

(56) References Cited

U.S. PATENT DOCUMENTS

| 4,792,176 A | 12/1988 | Karford |
| 5,104,174 A | 4/1992 | Gute |

(Continued)

FOREIGN PATENT DOCUMENTS

| CN | 204946736 U | 1/2016 |
| CN | 206493818 U | 9/2017 |

(Continued)

OTHER PUBLICATIONS

International Search Report and Written Opinion for International Patent Application No. PCT/EP2020/076103, dated Jan. 13, 2021, 14 pages.

*Primary Examiner* — Joseph D. Pape
(74) *Attorney, Agent, or Firm* — Withrow & Terranova, PLLC

(57) ABSTRACT

The invention relates to an extendable sun visor for a vehicle, comprising a base plate for providing a base area of shadowing, a first movable plate which is connected to the base plate and which is movable in relation to the base plate for providing a first additional area of shadowing, at least one second movable plate which is connected to the base plate and which is movable in relation to both the base plate and the first movable plate for providing at least one second additional area of shadowing, the at least one second additional area of shadowing being different from said first additional area of shadowing, and an actuating structure for actuating a movement of the at least one second movable plate when the first moveable plate is moved. A vehicle comprising such an extendable sun visor is also provided.

24 Claims, 6 Drawing Sheets

(56) References Cited

U.S. PATENT DOCUMENTS

| | | | |
|---|---|---|---|
| 5,855,405 A | 1/1999 | Robles | |
| 6,237,984 B1 | 5/2001 | Cross | |
| 7,240,951 B2 * | 7/2007 | Willerton | B60R 7/088 296/97.8 |
| 7,540,553 B1 * | 6/2009 | Mullis | B60J 3/0208 296/97.8 |
| 8,544,933 B1 | 10/2013 | Fuller | |
| 8,550,531 B1 * | 10/2013 | Fancher, III | B60J 3/0208 296/97.1 |
| 2008/0088150 A1 * | 4/2008 | Delphia | B60J 3/0239 296/97.11 |

FOREIGN PATENT DOCUMENTS

| | | |
|---|---|---|
| EP | 0345374 A1 | 12/1989 |
| JP | H07276982 A | 10/1995 |
| JP | 2008013056 A | 1/2008 |
| JP | 2018070143 A | 5/2018 |
| TW | M554419 U | 1/2018 |

\* cited by examiner

EXTENDABLE SUN VISOR

This application is a 35 USC 371 national phase filing of International Application No. PCT/EP2020/076103, filed Sep. 18, 2020, which claims the benefit of Indian Patent Application No. 201941040602, filed Oct. 7, 2019, the disclosures of which are incorporated herein by reference in their entireties.

TECHNICAL FIELD

The invention relates to a sun visor for a vehicle. The invention also relates to a vehicle comprising such a sun visor.

The invention can be applied in heavy-duty vehicles, such as trucks, buses and construction equipment. Although the invention will be described with respect to a truck, the invention is not restricted to this particular vehicle, but may also be used in other vehicles such as cars, boats and airplanes, etc.

BACKGROUND

Sun visors are commonly used in vehicles to shade the eyes of the driver from the glare of sunlight. Although conventional sun visors may be unfolded from the roof to different angles and may be swung back and forth between a side window and the front window (also referred to as windshield or windscreen), there are still improvements to be made. For example, conventional sun visors often leave a gap with the A-pillar of the vehicle, and they often also leave a gap with other neighbouring sun visors. Similarly, when swung to a side window, conventional sun visors often leave a gap with the B-pillar of the vehicle. Furthermore, short drivers may face reachability issues in folding and unfolding conventional sun visors to and from the interior roof of the vehicle.

SUMMARY

An object of the invention is to mitigate at least some of the drawbacks of conventional sun visors. This and other object, which will become apparent in the following, are achieved by a sun visor and a vehicle as defined in the accompanying independent claims.

According to a first aspect of the invention, there is provided an extendable sun visor for a vehicle, comprising:
 a base plate for providing a base area of shadowing,
 a first movable plate which is connected to the base plate and which is movable in relation to the base plate for providing a first additional area of shadowing,
 at least one second movable plate which is connected to the base plate and which is movable in relation to both the base plate and the first movable plate for providing at least one second additional area of shadowing, the at least one second additional area of shadowing being different from said first additional area of shadowing, and
 an actuating structure for actuating a movement of the at least one second movable plate when the first moveable plate is moved.

The invention is based on the realization that a sun visor may become extended to cover different areas, even though a driver only extends the sun visor in one direction. For instance, a vertical pulling of the first movable plate may suitably trigger a horizontal or diagonal movement of the second movable plate.

It should be noted that, the first movable plate may be directly connected to the base plate or indirectly, such as via an intermediate structure. Similarly, the second movable plate may be directly or indirectly connected to the base plate. For instance, the first movable plate may be connected to the base plate via the second movable plate, or the second movable plate may be connected to the base plate via the first movable plate.

It should also be noted that an actuating structure is or comprises a structure which may transfer the motion of the first movable plate into a motion in a different direction of the second movable plate. The actuating structure is thus a mechanical structure. Such a mechanical structure may for instance be or comprise an edge of one the movable plates which cooperates with a part of the other movable plate. Such an edge may be a folded edge, a roll-formed part of one or more plates, a welded or otherwise adhered structure. Rather than an edge portion, the actuating structure may be provided at a different portion of the movable plates, formed in one piece with the rest of the movable plate or provided by means of an attached part. Thus, an actuating structure may be formed in one piece with one or both the movable plates, or may be one or more separate components attached to at least one of the movable plates.

Furthermore, it should be noted that the extendable sun visor may comprise additional movable plates, in which case additional actuating structures may be provided for actuating the movement of the additional movable plate when the first movable plate is moved.

The base plate may suitably be mounted in a swivelling manner at/near an upper part of a window of a vehicle, as is customary.

According to at least one exemplary embodiment, the base plate extends in a length direction, a height direction and a thickness direction, wherein the length of the base plate is greater than the height, and the height of the base plate is greater than the thickness, wherein the first movable plate is movable in the height direction. This is advantageous, since the first movable plate may, for instance, be pulled downwardly by a user (such as a driver or a passenger) and provide adequate shading even if the user is relatively short. Furthermore, the subsequent control, such as folding or swinging the sun visor is facilitated for a short user, since the sun visor becomes easier to reach because of the extension in the height direction (due to a movement of the first movable plate downwardly relative to the base plate). It should be noted that most of the time, in normal use, when the sun visor is unfolded to block part of the front window, the length direction will substantially coincide with the transverse direction of the vehicle (side-to-side direction), while the height direction will substantially correspond to the direction from roof to floor. It should be understood that in other exemplary embodiments, the first movable plate may be designed to be movable in a different direction, such as the length direction, in which case the second movable plate may be caused to move in the height direction or diagonally to the length and height directions.

According to at least one exemplary embodiment, the first movable plate is movable in a different direction than the at least one second movable plate. This is advantageous since the areas of shadowing may be extended in more than one direction compared to the base area of shadowing provided by the base plate. For instance, the first additional area of shadowing may provide an extension of the shadowing in the height direction, while the second additional area of shadowing may provide an extension of the shadowing in the length direction.

According to at least one exemplary embodiment, the actuating structure comprises a first actuation surface provided on the first movable plate and a second actuation surface provided on the second movable plate, wherein the first actuation surface is configured to push the second actuation surface when the first movable plate is moved for providing said first additional area of shadowing. By the provision of cooperating actuation surfaces on the respective movable plates, the a simple and advantageous mechanical actuation is achievable. The motion of the first movable plate will via the engagement between the first and second actuation surfaces transfer a motive force to the second movable plate.

According to at least one exemplary embodiment, the first movable plate has a main extension in a geometrical plane, wherein the first actuation surface extends at an angle to said geometrical plane. The first movable plate is suitably moved along the extension of said geometrical plane. Thus, by having a first actuation surface which is angled or incline in relation to (or otherwise deviates from) the geometrical plane along which the first movable plate is moved, the first actuation surface may come to abut and push any structure which is in its way during the movement of the first movable plate. Such a structure may thus be a second actuation surface provided on the second movable plate. The first actuation surface may extend at any suitable angle relative to said geometrical plane. For instance, it may be perpendicular to said geometrical plane, however, other non-zero angles are also conceivable. It should be understood, that other alternatives are also possible, which may not have a clearly defined angle but which still present a first actuating surface which stands out (for example projects) from the main part of the first movable plate and said geometrical plane.

According to at least one exemplary embodiment, the second actuation surface extends at an angle to said geometrical plane. Thus, when the first movable plate is moved, the second actuation surface will present a structure, like an obstacle, which the first movable plate (or more specifically the first actuation surface of the first movable plate) will push when coming into contact with the second actuation surface. Suitably, although not necessarily, the second actuation surface may have an inclination which mates with the inclination of the first actuation surface. For instance, if the first actuation surface forms an angle of 45° relative to said geometrical plane, the second actuation surface may suitably form an angle of 135° relative to said geometrical plane, wherein the first and second actuation surface will form a common contact interface. The above numbers are, of course, just an example. The second actuation surface may form any other suitably non-zero angle relative to said geometrical plane, such as for example 90°.

According to at least one exemplary embodiment, the first actuation surface and the second actuation surface extend diagonally with respect to said length direction and height direction of the base plate. This is advantageous since the diagonal interface provides force components/vectors in both the length direction and the height direction.

For instance, if the first movable plate is moved in the height direction, the second movable plate will in addition to experiencing a force component in the height direction, also experience a force component in the length direction, due to the diagonally extending and cooperating first and second actuation surfaces. Similarly, if the first movable plate is configured to be moved in the length direction, the second movable plate will experience a force component not only in the length direction but also in the height direction.

According to at least one exemplary embodiment, when the movement of the at least one second movable plate is actuated by the actuating structure, the at least one second movable plate moves in the length direction of the base plate for providing said at least one second additional area of shadowing. This is advantageous since it can increases the shadowing in the transverse direction of the car. Thus, reducing area in which the sun glare can enter through the windows.

According to at least one exemplary embodiment, the second movable plate and the base plate are provided with mutually cooperative guide means. The guide means may, for example, comprise a track provided in one of the base plate and second movable plate, and a protrusion movable in the track is provided in the other one of the base plate and second movable plate.

According to at least one exemplary embodiment, one of the at least one second movable plate and the base plate is provided with a guide extending in the length direction of the base plate, and the other one of the at least one second movable plate and the base plate is provided with a guide-following protrusion or recess which is configured to be guided in the length direction. This advantageous, since even though the second movable plate may be partly subjected to a force component in the height direction, in addition to a force component in the length direction, the guide and the guide-following protrusion or recess will promote a movement of the second movable plate in the length direction. In some exemplary embodiments, the guide may suitable be the form of a track in which a protrusion may be guided. In some exemplary embodiments, the guide may be in the form of a beam or other raised structure wherein a recess (for instance U-shaped) in a guide-following portion may enclose the beam.

According to at least some exemplary embodiments, wherein the first actuation surface and second actuation surface extend in the length direction of the base plate. Thus, since the actuation surfaces extend in the length direction of the base plate may face each other in the height direction of the base plate. Therefore, if the first movable plate is designed to be moved in the height direction, the second movable plate will be subjected to a pushing force in the height direction. Thus, without any means for deviating the direction of movement of the second movable plate, it too will move in the height direction and provide an additional area of shadowing in the height direction. However, in at least some exemplary embodiments, the second movable plate is re-routed by appropriate deviating means such as a guide and guide following protrusion or recess.

According to at least one exemplary embodiment, when the movement of the at least one second movable plate is actuated by the actuating structure, the at least one second movable plate moves diagonally with respect to the length direction and the height direction of the base plate for providing said at least one second additional area of shadowing. Other motions are of course also conceivable. For instance, in some exemplary embodiments, the at least one second movable plate may move along a curved path, such as along a circle segment, as it is pushed in the height direction (for instance, a guide in the form of curved track may be provided in the second movable plate in which a guide-following protrusion of the first movable plate may be guided). Thus, in a general sense, according to at least one exemplary embodiment, the at least one second movable plate may be moved along a path which at least partly deviates from the height direction and the length direction.

According to at least one exemplary embodiment, one of the at least one second movable plate and the base plate is provided with a guide extending diagonally relative to the length direction and the height direction of the base plate, and the other one of the at least one second movable plate and the base plate is provided with a guide-following protrusion or recess which is configured to be guided diagonally relative to the length direction and the height direction of the base plate. This is advantageous since it may not only provide additional area of shadowing laterally of the base plate (i.e. in the length direction), but may also supplement the shadowing of the first movable base plate by enlarging the shadowing below the base plate (i.e. in the height direction). For instance, at least a part of the second movable plate may become moved by the actuating structure to a location adjacent to the first movable plate so that the first and second movable plates are placed next to, or overlapping, each other in the length direction.

According to at least one exemplary embodiment, the sun visor further comprises at least a third movable plate for providing at least a third additional area of shadowing, wherein the at least a third movable plate is caused to move when the first movable plate is moved to provide the first additional area of shadowing. This is advantageous since this may provide an even larger total area of shadowing compared to using only the first and second movable plates. The at least a third movable plate may suitably be movable in a different direction then then first and/or second movable plates. Similarly to the second movable plate, there may be provided an actuating structure and actuating surfaces for moving the third movable plate. Thus, the structural and functional features discussed above in connection with the second movable plate may be implemented correspondingly for the third movable plate.

According to at least one exemplary embodiment, the at least one second movable plate and the at least one third movable plate are configured to move at an angle relative to each other. This is advantageous since this may provide for an efficient yet simple solution for increasing the total area of shadowing. For instance, a second movable plate may be moved in the lateral or diagonal direction, while the third movable plate may be moved in the other one of the lateral or diagonal direction. In at least some exemplary embodiments, in the fully extended state of the sun visor, at least two of the first, second and third movable plates are located adjacent to, or overlapping, each other. For instance, in some exemplary embodiments, in the fully extended state of the sun visor, the second movable plate may be located adjacent to, or overlapping, the third movable plate. In some exemplary embodiments, the second movable plate may be located adjacent to, or overlapping, both the first and the third movable plates. For instance, the second movable plate may have the first movable plate as a neighbour in the length direction and the third movable plate as a neighbour in the height direction.

According to at least one exemplary embodiment, the at least a third movable plate comprises a pair of third movable plates adapted to protrude from opposite ends of the base plate for providing two additional third areas of shadowing, wherein the motions of the third movable plates are mirror symmetrical. This is advantageous as the one and the same movement of the first movable plate may cause the pair of third movable plates to extend on either side of the base plate, thereby creating a larger area of shadowing. Each one of the third movable plates, may be actuated in the corresponding way as described above. Thus, the structural and functional features discussed in connection with the second movable plate may be implemented correspondingly for each one of the third movable plates.

According to at least one exemplary embodiment, the height of the base plate extends from an upper end to a lower end thereof, wherein the first movable plate is configured to move in the height direction pointing from the upper end to the lower end, wherein the pair of third movable plates are arranged at said upper end and configured to move in parallel with the main plane of the base plate and obliquely to the height direction of the base plate. By such an oblique movement, the third movable plates will extend the area of shadowing in both the height direction and the length direction, compared to the base area of shadowing provided by the base plate.

According to at least one exemplary embodiment, the at least one second movable plate comprises a pair of second movable plates, wherein the second movable plates are adapted to protrude from opposite ends of the base plate for providing two additional second areas of shadowing, wherein the movements of the second movable plates are mirror symmetrical. This is advantageous as the one and the same movement of the first movable plate may cause the pair of second movable plates to extend on either side of the base plate, thereby creating a larger area of shadowing. Each one of the second movable plates, may be actuated in the corresponding way as described above. Thus, the structural and functional features previously discussed in connection with the second movable plate may be implemented correspondingly for each one of the second movable plates.

According to at least one exemplary embodiment, the pair of second movable plates are arranged at said upper end and configured to move in opposite directions in parallel with the length direction of the base plate. By such a movement, the second movable plates will extend the area of shadowing in the length direction, compared to the base area of shadowing provided by the base plate.

According to at least one exemplary embodiment, the base plate is a first base plate, wherein the sun visor further comprises a second base plate connected to and forming a housing with the first base plate, wherein the first movable plate and the at least one second movable plate are movably arranged in the housing. This is advantageous since the first and second movable plates may be stowed away when it is not desired to use the sun visor in its extended state. If two or more second movable plates are included in the sun visor, they may all be stored in the housing. Similarly, in embodiments having one or more third movable plates, such movable plates may also be stored in the housing when not needed for providing additional shadowing.

Thus, according to at least one exemplary embodiment, the base plate is a first base plate, wherein the sun visor further comprises a second base plate connected to and forming a housing with the first base plate, wherein the first movable plate and the at least one third movable plate are movably arranged in the housing.

According to at least one exemplary embodiment, the sun visor has a non-extended state in which at least a major portion of the first movable plate and a major portion of the at least one second and/or third movable plate are located within the housing, and an extended state in which the first movable plate and the at least one second and/or third movable plate protrude out from the housing and smaller portions than said major portions remain in the housing. This provides for a simple yet efficient way for switching between a non-extended state and an extended state of the sun visor.

In embodiments having the first and second base plates, and also the second and third movable plates, there is suitably provided guiding means in one of the first and second base plates which cooperate with guiding means in one of the second and third movable plates (for example, first base plate and second movable plate may have cooperative guiding means such as guide and guide following protrusion or recess, respectively); and similarly there is suitably provided guiding means in the other one of the first and second base plates which cooperate with guiding means in the other one of the second and third movable plates (for example, second base plate and third movable plate may have cooperative guiding means such as guide and guide following protrusion or recess, respectively).

From the above, it is clear that in a general sense, in at least some exemplary embodiments, the first, second (and third, if present) movable plates may be movable between a first position (non-extended position of the sun visor), where they are substantially covered by the base plate (at least on one side), and a second position (extended position of the sun visor), where they are at least partly located outside of the outer boundary of the base plate so as to form said additional areas of shadowing.

In any one of the discussed, and other exemplary embodiments, it is conceivable to include one or more stop (or limiting) surfaces, which limit the movements of the first, second and/or third movable plates. For instance, in the case of embodiments having a housing, the stop surfaces may prevent the movable plates from falling out completely from the housing when the first movable plate is moved to an extended state of the sun visor. Thus, the stop surfaces may be used to define a maximum range of movement of the movable plates, which in turn may be used to define a maximum additional area of shadowing.

According to at least one exemplary embodiment, the first base plate is connected to the second base plate by one or more magnets. This is advantageous since magnets have enough power to hold the complete extendable sun visor together in the non-extended state, and also enough strength to allow the second (and third, if present) movable plate to move when the first movable plate is pulled by a user. The one or more magnets may, for instance, be permanent magnets. In other embodiments the magnets may be electromagnets. The first and second base plate may be provided with mating magnets or one of the first and second base plates may be provided with a magnet which mates with a metal element provided in/on the other one of the first and second base plates. It should be understood that the mating magnets (or magnet and mating metal element) are not necessarily in contact with each other. On the contrary, one or more of the movable plates may be movably arranged between the mating magnets (or between the magnet and the mating metal element), the force of attraction being large enough to keep the first and second base plates fixed relative to each other even though one or more of the movable plates is/are arranged between the magnets.

According to at least one exemplary embodiment, the one or more magnets are provided in depressions in at least one of the first base plate and the second base plate. This provides an advantageous space-saving solution. Suitably, each magnet is tightly fitted into a respective depression. If a magnet is provided to mate with a metal element, then such a metal element may be provided in a corresponding depression.

The first, second (and third, if present) movable plates may suitably be slidably arranged relative to the base plate and relative to each other. Furthermore, the first, second (and third, if present) movable plates, and the base plate, may suitably be arranged and movable in parallel geometrical planes. According to one exemplary embodiment, the base plate and the movable plates form a sandwiched structure. In exemplary embodiments having a first and second base plate, the movable plates are sandwiched between the first and second base plates.

According to a second aspect of the invention, the object is achieved by a vehicle comprising the extendable sun visor according to the first aspect, including any embodiments thereof. The advantages of the second aspect are largely analogous with the advantages of the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
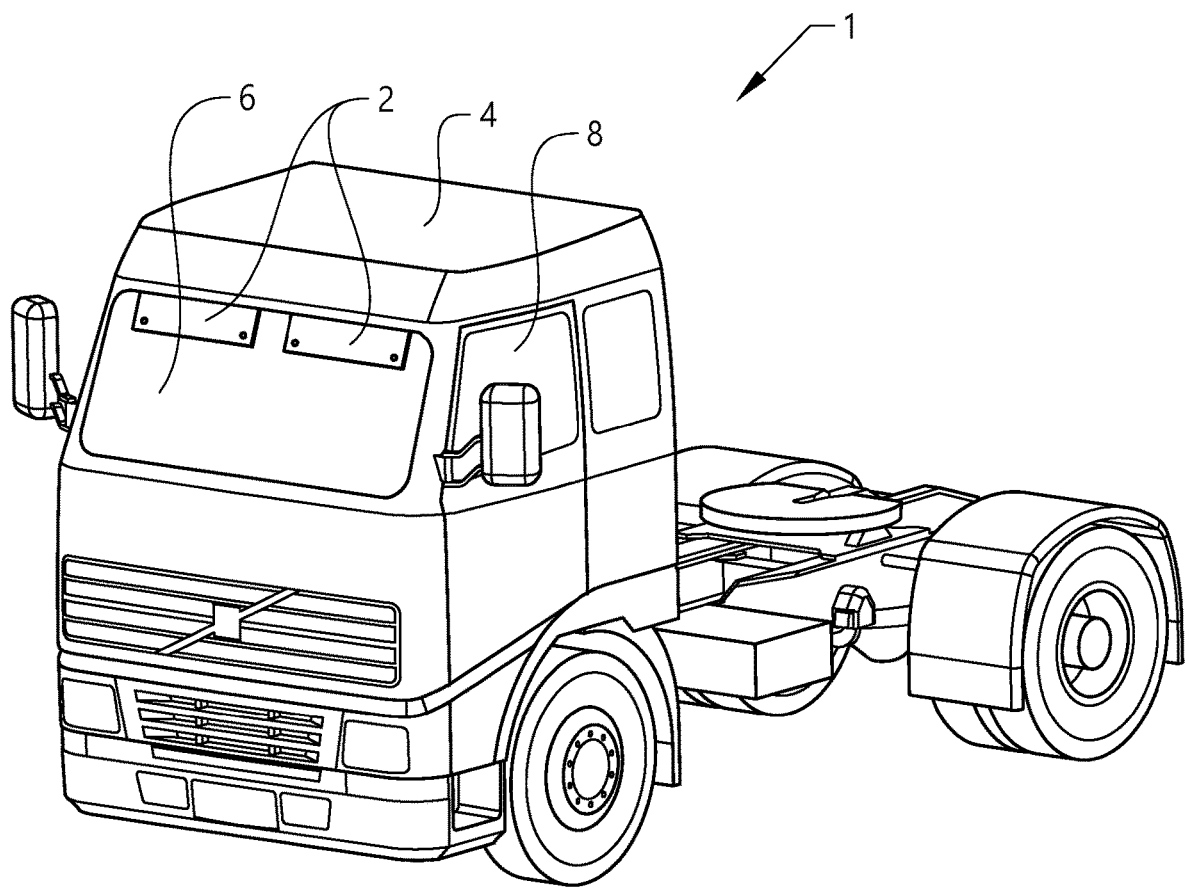
FIG. 1 illustrates a vehicle comprising extendable sun visors, in accordance with at least one exemplary embodiment of the invention.

FIG. 1 illustrates a vehicle 1 comprising extendable sun visors 2, in accordance with at least one exemplary embodiment of the invention. Although the vehicle 1 is illustrated in the form of a truck, other types of vehicles, such as busses construction equipment or cars, etc. may be provided with the inventive extendable sun visors 2.

The truck (vehicle) comprises a cab 4 in which a driver may operate the vehicle 1. The cab 4 comprises a front window 6 and side windows 8. The extendable sun visors 2 are provided at/near the upper part of the front window 6. Suitably the sun visors 2 may pivot up and down around a pivot axis, and may suitably also be turned to cover the nearest side window 8. Any suitable conventional suspending arrangement for the sun visors 2 may be provided, and will not discussed in more detail in this disclosure.

Figure 2A:
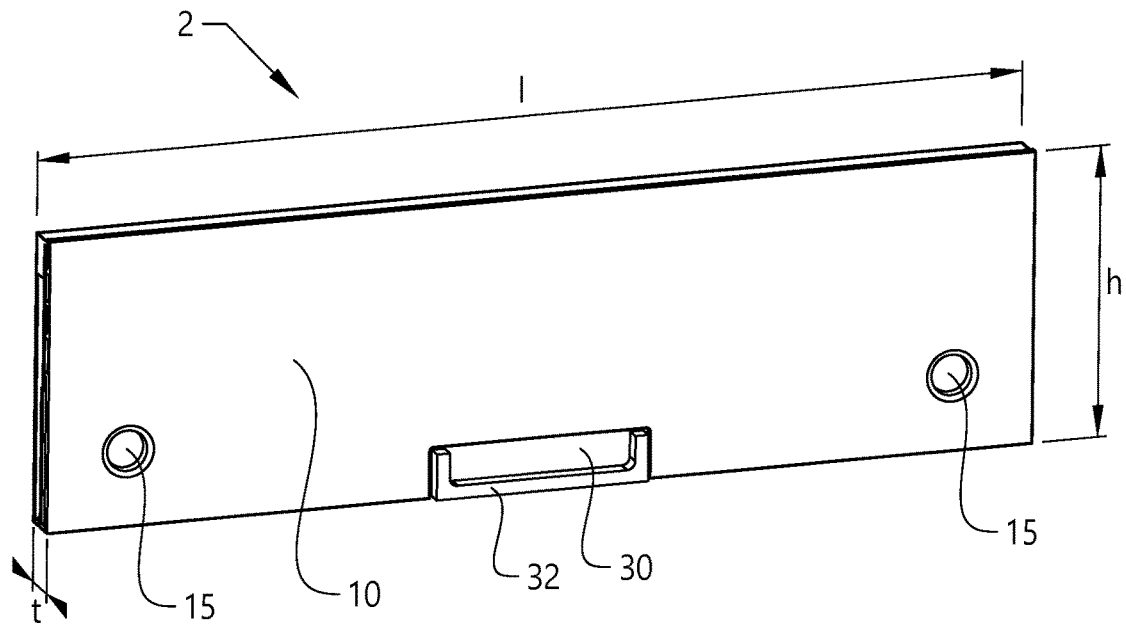
FIG. 2a illustrates an extendable sun visor according to at least one exemplary embodiment, the sun visor being in its non-extended state.
Figure 2B:
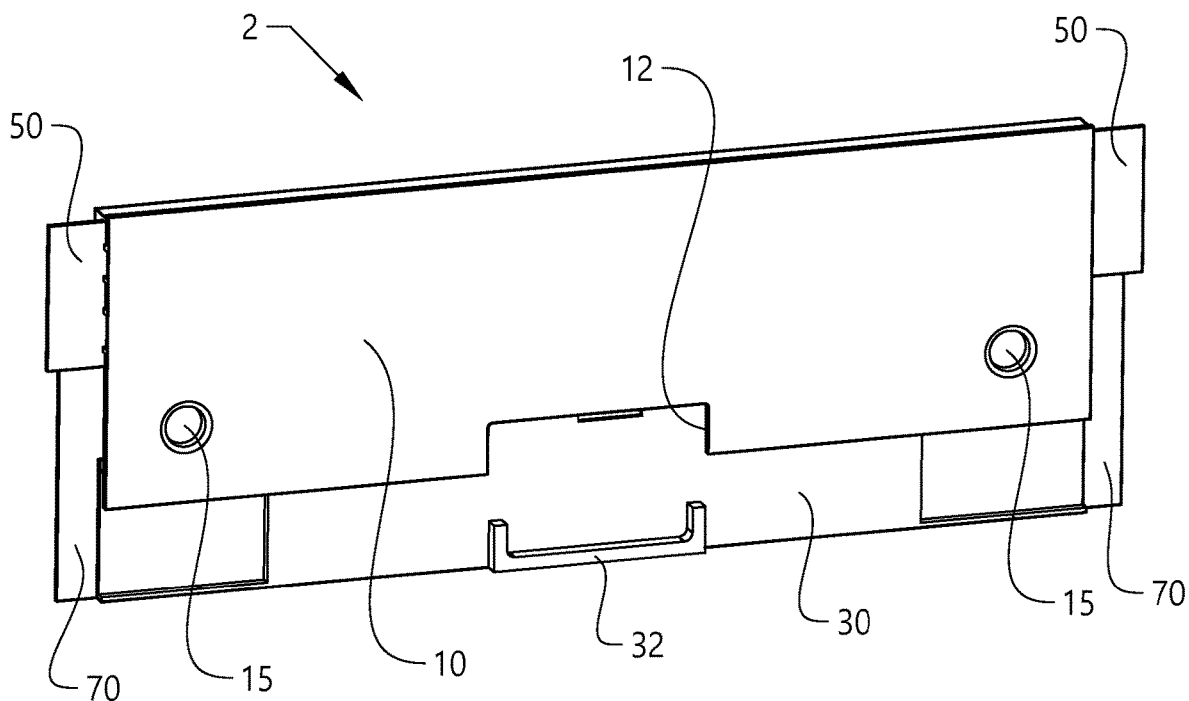
FIG. 2b illustrates the extendable sun visor of FIG. 2a, the sun visor being in its extended state.

FIG. 2a illustrates an extendable sun visor 2 according to at least one exemplary embodiment, the sun visor 2 being in its non-extended state. FIG. 2b illustrates the extendable sun visor 2 of FIG. 2a, the sun visor 2 being in its extended state. The extendable sun visor 2 comprise a base plate 10 for providing a base area of shadowing. The illustrated base plate 10 extends in a length direction l, a height direction h and a thickness direction t, wherein the length l of the base plate 10 is suitably greater than the height h, and the height h of the base plate 10 is suitably greater than the thickness t.

The base area of shadowing is obtained when the sun visor 2 is in the non-extended state, as illustrated in FIG. 2a. The sun visor 2 further comprises a first movable plate 30 which is connected to the base plate 10 and which is movable in relation to the base plate 10 for providing a first additional area of shadowing. The base plate 10 is provided with a cutout or recess 12 making a small portion of the first movable plate 30, which is located behind the base plate 10, visible in FIG. 2a. In the illustrated exemplary embodiment, the first movable plate 30 is provided with a grip or handle 32 for facilitating for a user to move, such as by pulling, the first movable plate 30. However, it should be understood that in other exemplary embodiments such a grip or handle 32 may be omitted, and the user may grip the surface of the first movable plate 30 as such.

When the first movable plate 30 has been moved, downwardly in the drawings (i.e. in the height direction h), the sun visor 2 will be in its extended state, as illustrated in FIG. 2b. As can be seen in the drawings, the total height of the sun visor 2 has increased in FIG. 2b compared to FIG. 2a. Thus, in this exemplary embodiment the first additional area of shadowing provided by the first movable plate 30 increases the shadowing in the height direction h of the base plate 10. It should be noted however, that the invention is not limited to the first movable plate 30 being movable in the height direction h (and the other movable plates, which will be discussed, in other directions). Thus, the skilled person will readily understand that the inventive principle can be used for manufacturing other embodiments in which the plates are moved in other directions than the ones illustrated. For instance, the first movable plate 30 may in some exemplary embodiments be configured to move in the length direction l.

As can be seen in FIG. 2b, when the first movable plate 30 was moved, the total area of shadowing of the sun visor 2 was also increased in the length direction l. In accordance with inventive concept, the sun visor 2 also comprises at least one second movable plate 50 which is connected to the base plate 10 and which is movable in relation to both the base plate 10 and the first movable plate 30 for providing at least one second additional area of shadowing, the at least one second additional area of shadowing being different from said first additional area of shadowing. In the exemplary embodiments of the drawings, apart from the first movable plate 30, there are actually four additional movable plates. These will in the following be referred to as a pair of second movable plates 50 and a pair of third movable plates 70. The references to the second and third movable plates 50, 70 could of course be interchanged (thus, the second movable plates 50 could in other descriptions be referred to as representing third movable plates and the third movable plates 70 could be referred to as representing second movable plates). It should also be noted that the number of additional plates do not need to be four as in the illustrated exemplary embodiments. The inventive concept is equally applicable if there would only be one additional pair of plates, for instance, just the second movable plates 50, or just the third movable plates 70. In fact, the inventive concept is equally applicable, if there would only be one additional plate, for instance, one of the second movable plates 50 or one of the third movable plates 70. Other combinations in other exemplary embodiments, such as one second movable plate 50 and one third movable plate 70, are of course also conceivable.

According to the inventive concept, the extendable sun visor 2 comprises an actuating structure for actuating a movement of the at least one second movable plate 50 when the first movable plate 30 is moved. In the case of a plurality of additional plates, such as the illustrated pairs of second movable plates 50 and third movable plates 70, there may be several actuating structures. The movement of the second and third movable plates 50, 70 are best explained in connection with the exploded views of FIG. 3a and FIG. 3b.

Figure 3A:
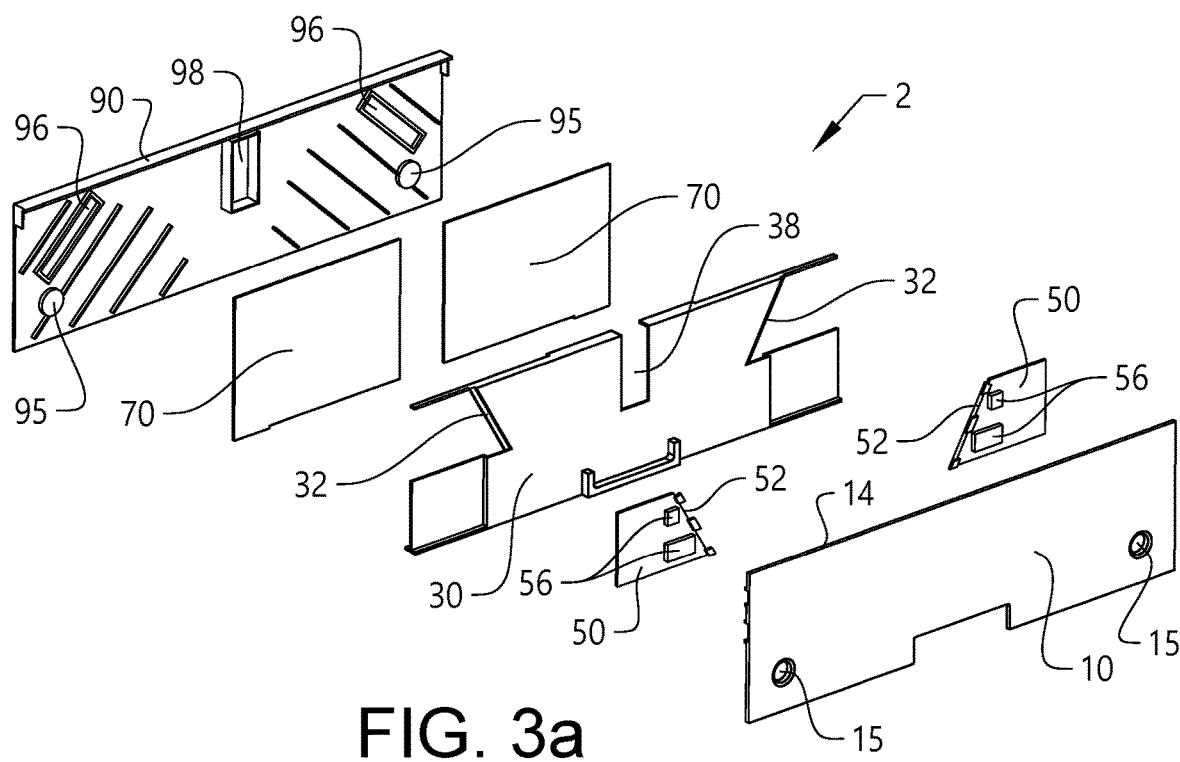
FIG. 3a illustrates the extendable sun visor in an exploded view seen from one direction.
Figure 3B:
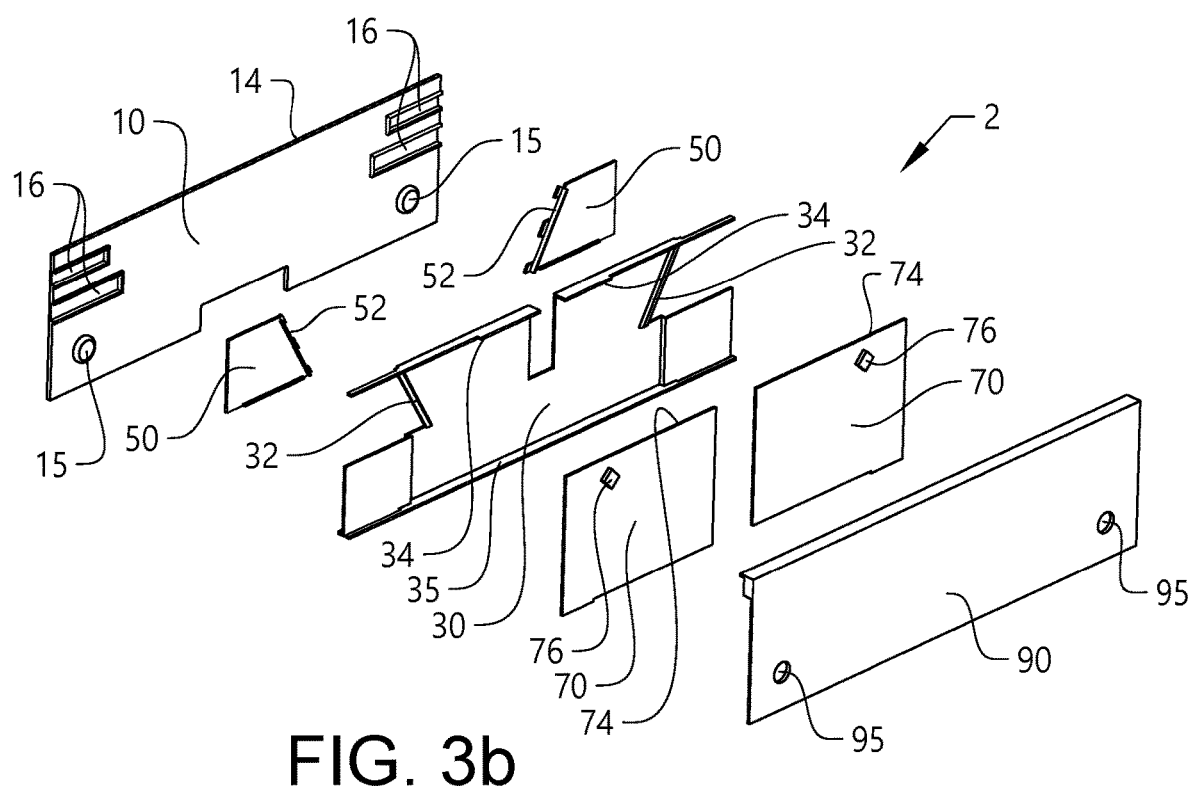
FIG. 3b illustrates the extendable sun visor in an exploded view seen from a different direction.

FIG. 3a illustrates the extendable sun visor 2 in an exploded view seen from one direction, whereas FIG. 3b illustrates the extendable sun visor in an exploded view seen from a different direction. As can be seen in FIG. 3a and FIG. 3b, the base plate 10 is a first base plate 10. The sun visor 2 also comprises a second base plate 90 connected to and forming a housing with the first base plate 10, wherein the first movable plate 30 and the at least one second movable plate 50 (in the present embodiment the pairs of second and third movable plates 50, 70) are movably arranged in the housing. It should be understood that although the illustrated exemplary embodiments show two separate base plates 10, 90 which together form a housing, in other exemplary embodiments the sun visor may have a single base plate. For instance, a corresponding housing could be achieved by making it in one piece with only one thick base plate and providing the base plate with interior cavities and apertures to allow for the containing and the displacements of the movable plates 30, 50, 70. For the illustrated exemplary embodiment, when the sun visor 2 is used in its normal position to counteract glare through the front window, the first base plate 10 may suitably be located closest to the user i.e. facing in the rearward direction of the vehicle, while the second base plate 90 may be located most remote from the user, i.e. facing the forward direction of the vehicle. It is, however, conceivable to mount the sun visor 2 the other way around, if so desired.

According to at least some exemplary embodiments, the actuating structure comprises a first actuation surface provided on the first movable plate and a second actuation surface provided on the at least one second movable plate, wherein the first actuation surface is configured to push the second actuation surface when the first movable plate is moved for providing said first additional area of shadowing. In the case of more additional plates, there may be more actuation surfaces. With reference to FIG. 3a and FIG. 3b, the first movable plate 30 is provided with a pair of first actuation surfaces 32, which in the illustrated exemplary embodiment are illustrated as obliquely extending edge portions. The oblique extension is such that they extend obliquely relative to both height direction h and the length direction l. Each one of the second movable plates 50 comprises a correspondingly obliquely extending edge portion presenting a second actuation surface 52.

In the initial non-extended state the oblique mating edge portions of the first and second movable plates 30, 50, i.e. the first and second actuation surfaces 32, 52, will substantially co-extend from near an upper end 14 of the first base plate 10. However, when the first movable plate 30 is moved downwards, the first actuation surfaces 32 of the first movable plate 30 will push the respective second actuation surfaces 52 of the second movable plates 50. In this exemplary embodiment, the second movable plates 50 are prevented from moving downwardly (in the height direction h) and are only allowed to move laterally (in the length direction l), which will soon be explained. This has the effect that, due to the obliquely extending interface between the actuation surfaces 32, 52, when the first actuation surfaces 32 move down along the second actuation surfaces 52 they will at the same time push the second actuation surfaces 52 in the length direction, i.e. perpendicularly to the movement of the first movable plate 30. In FIG. 3b, the side of the first base plate 10 which faces the movable plates is visible, i.e. an inwardly facing side with respect to the housing formed by the first and second base plates 10, 90. This inwardly facing side of the base plate is provided with a guide 16 in the form of tracks. In FIG. 3a, it can be seen that the second movable plates 50 are provided with guide-following protrusions 56 which are configured to travel along and within the guiding tracks 16. Since the guiding tracks 16 extend in the length direction l, the second movable plates 50 will only be allowed to move in the length direction l as the first actuation surfaces 32 push the second actuation surfaces 52. Thus, the second additional areas of shadowing are provided by movement of the second movable plates 50 in a respective length direction l. It should, however, be understood that if desired, the guiding tracks 16 could extend in other directions, depending on which additional area of shadowing is desired and where. Thus, in a more general sense, according to at least one exemplary embodiment, the first movable plate 30 is movable in a different direction than the at least one second movable plate 50.

From the above explanations and the illustrated exemplary embodiment, it is clear that the first actuation surface 32 (or surfaces 32) may suitably extend at an angle to a geometrical plane in which the first movable plate 30 has its main extension. Said geometrical plane may suitably be parallel to the plane of the first base plate 10. Thus, the first actuation surface 32 has an extension in the thickness direction t. Suitably, the second actuation surface 52 (or surfaces 52) also extends at an angle to said geometrical plane, i.e. in the thickness direction t. In conclusion, the first and second actuation surfaces 32, 52 may suitably extend obliquely (diagonally) to the height direction h and the length direction l and may suitably extend in the thickness direction t.

Now the actuation of the movement of the pair of third movable plates 70 will be discussed. It should be noted that although reference will be made to third movable plates and third and fourth actuation surfaces, this is just for facilitating the understanding of the drawing figures and avoiding using the same terms for the different plates and actuation surfaces in the same drawing figures. However, as will be readily appreciated by the skilled person, the referral in the accompanying claims to second movable plates and to first and second actuation surfaces is understood as applicable to the elements in the drawings which (for convenience) are referred to as third movable plates and third and fourth actuation surfaces.

As illustrated in FIGS. 3a and 3b the first movable plate 30 may be provided with actuation surfaces extending in the length direction, these actuation surfaces are in the following referred to as third actuation surfaces 34. The third actuation surfaces 34 are formed by bent upper edge portions of the first movable plate 30. These bent upper edge portions are configured to mate with and push upper edges of the third movable plates 70, which thus present fourth actuation surfaces 74, also extending in the length direction l.

As can be seen in FIG. 3a the inwardly facing side of the second base plate 90 is provided with guides 96 in the form of guiding tracks 96 extending diagonally relative to the length direction l and the height direction h. As can be seen in FIG. 3b, each one of the third movable plates 70 is provided with a respective guide-following protrusion 76 which is configured to be guided diagonally relative to the length direction l and height direction h. Thus, when the first movable plate 30 is moved downwardly, the movement of the pair of third movable plates 70 is actuated by the actuating structure formed by the third and fourth actuation surfaces 34, 74, such that the third movable plates move diagonally with respect to the length direction l and the height direction h providing third additional areas of shadowing.

Figure 4A:
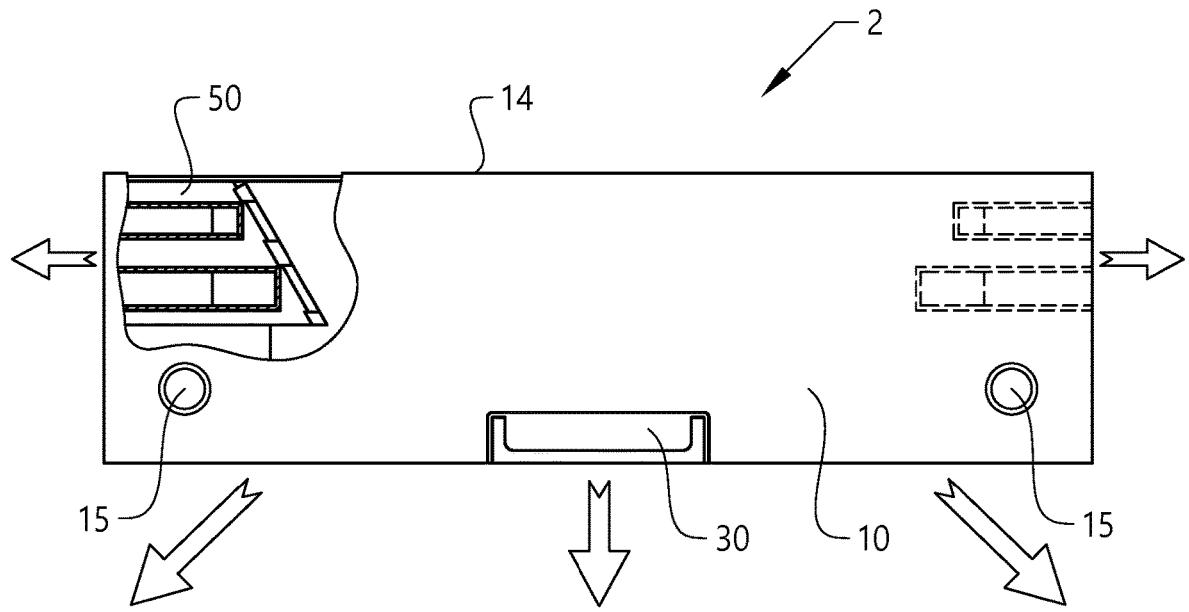
FIG. 4a illustrates the extendable sun visor in a partly cut-away view in its non-extended state.
Figure 4B:
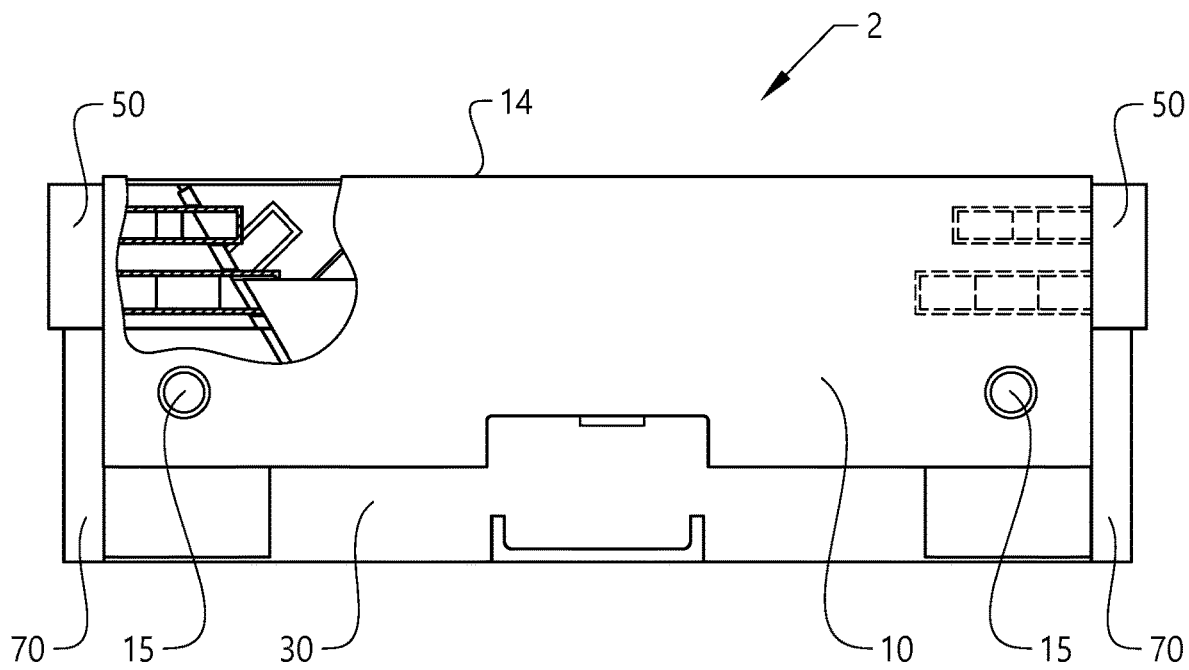
FIG. 4b illustrates the extendable sun visor in a partly cut-away view in its extended state.
Figure 5A:
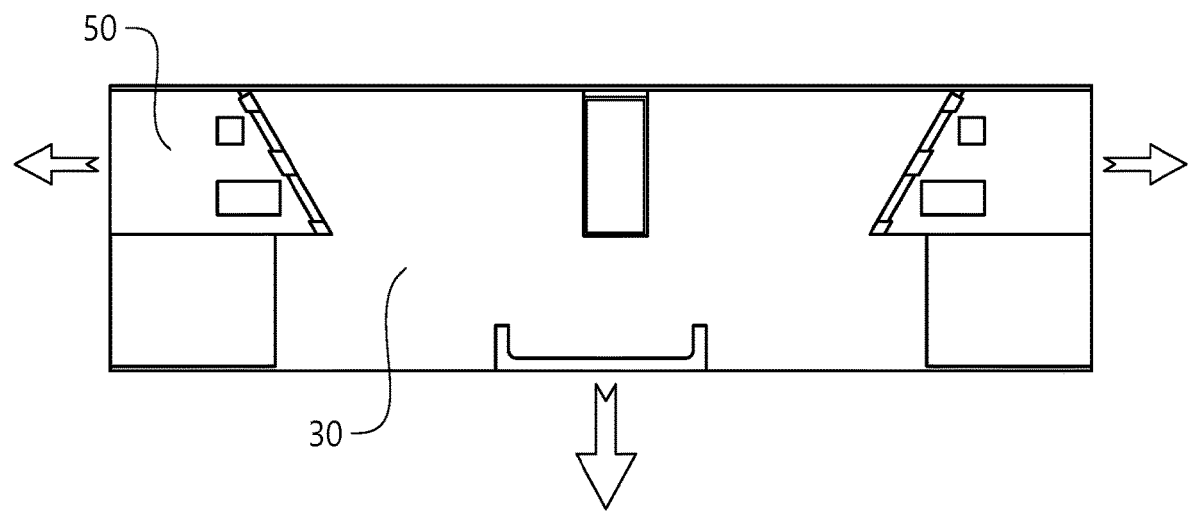
FIG. 5a illustrates the extendable sun visor in a view in which a base plate in the form of a front plate has been removed, the extendable sun visor being in its non-extended state.
Figure 5B:
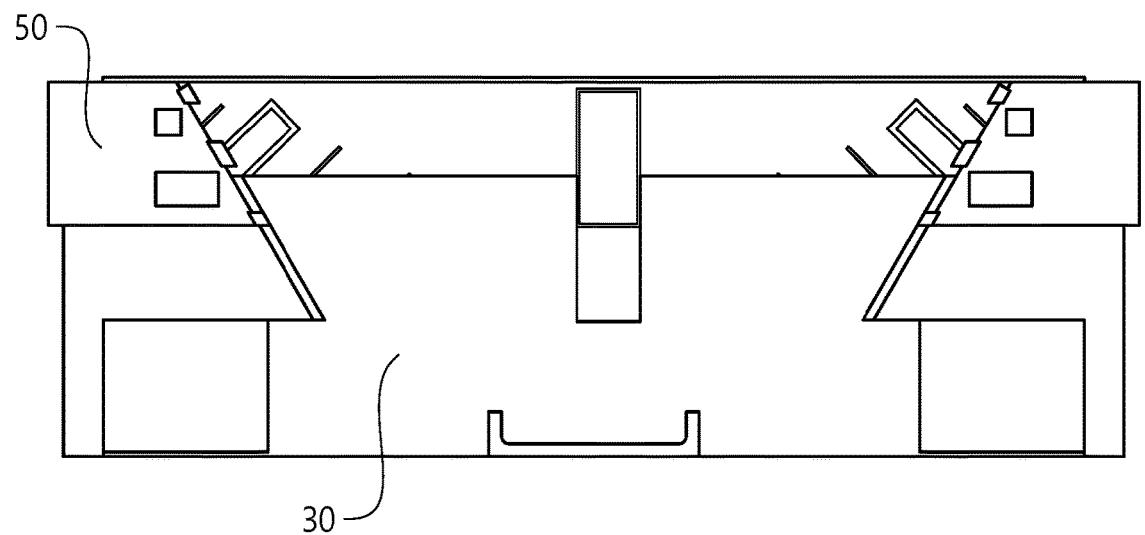
FIG. 5b illustrates the extendable sun visor in a view in which a base plate in the form of a front plate has been removed, the extendable sun visor being in its extended state.
Figure 6A:
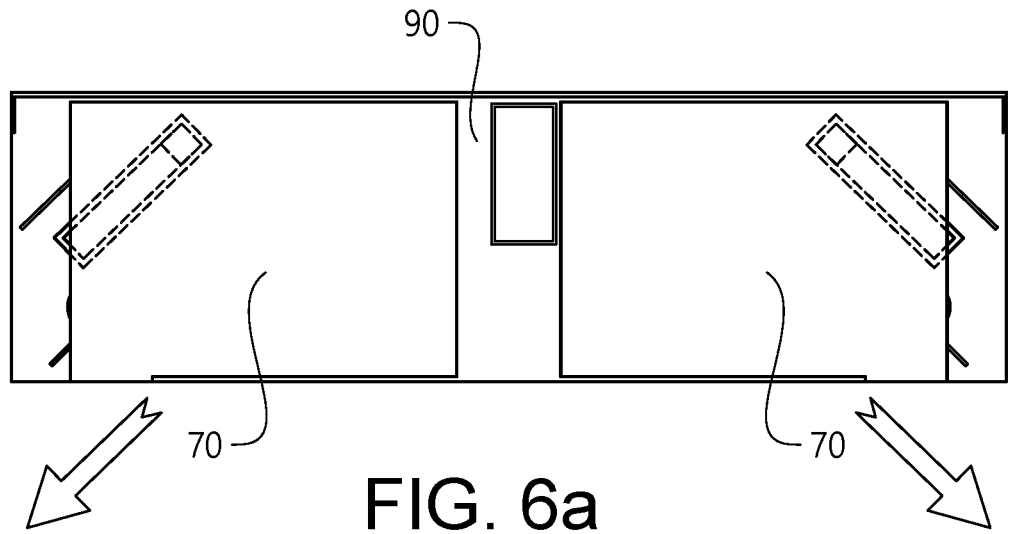
FIG. 6a illustrates the extendable sun visor in a view in which further plates have been removed, the extendable sun visor being in its non-extended state.
Figure 6B:
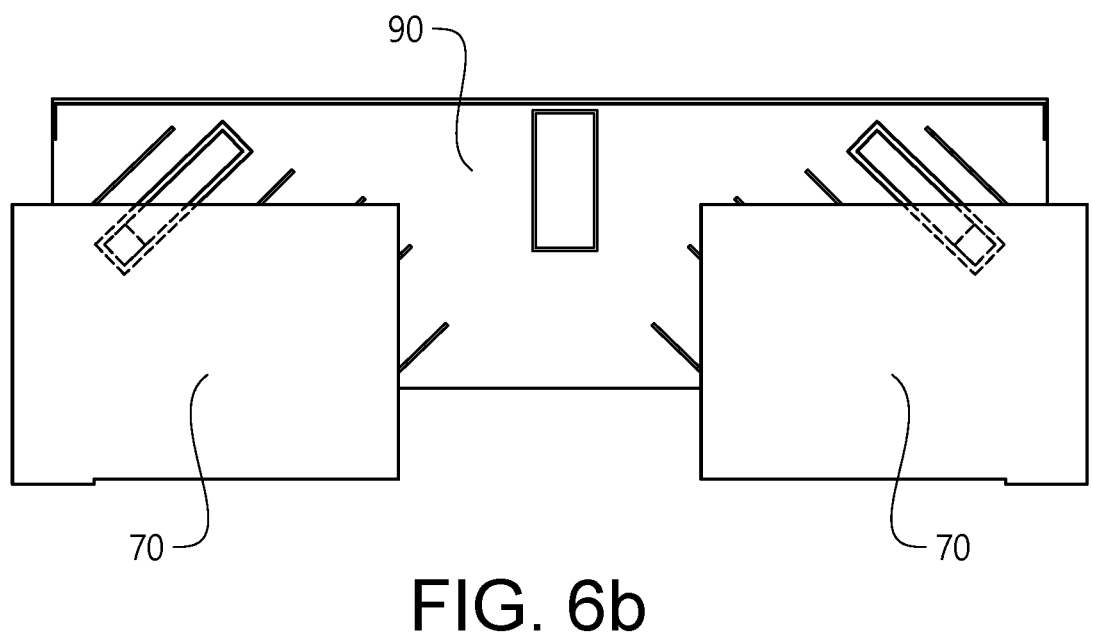
FIG. 6b illustrates the extendable sun visor in a view in which further plates have been removed, the extendable sun visor being in its extended state.

As best seen in FIG. 6a (and partly in FIG. 4a), in the initial non-extended state of the sun visor 2, the third movable plates 70 are arranged at the upper end 14 of the first base plate 10 (and the second base plate 90). When the first movable plate 30 is moved in the height direction h (pointing from the upper end to the lower end of the base plates) the pair of the third movable plates 70 will move in parallel with the main plane of the base plates 10, 90 and obliquely to the height direction h, and obliquely to the length direction l, of the base plates 10, 90, as is clear from FIG. 6b (and also from FIG. 4b). As can also be seen in FIG. 4a and FIG. 4b, and in particular in FIGS. 5a and 5b, the pair of second movable plates 50 are also initially arranged at the upper end 14 of the first base plate 10 and configured to move in opposite directions in parallel with the length direction l of the first base plate 10, when the first movable plate 30 is moved in the height direction h.

Due to the diagonal movement, the third additional areas of shadowing will contribute in increasing the total area of shadowing in both the length direction l and the height direction h, as is clear when comparing FIG. 2a and FIG. 2b. Thus, in a general sense, according to at least one exemplary embodiment, the at least one second movable plate 50 and the at least one third movable plate 70 are configured to move at an angle relative to each other. As seen in FIG. 2b, in the extended state of the sun visor 2, each one of the third movable plates 70 will provide additional areas of shadowing adjacent to the first movable plate 30 as well as adjacent to a respective one of the second movable plates 50. As is also clear from the figures, the second and third movable plates 50, 70 may be adapted to protrude from opposite ends of the base plates 10, 90, wherein the motions of the second movable plates 50 are mirror symmetrical, and wherein the motions of the third movable plates 70 are also mirror symmetrical. It should, however, be understood, that if desired, the guides 16 in the first base plate 10 and the guides 96 in the second base plate 90 may be directed differently if it is desired to provide asymmetrical movements of the movable plates.

As can also be seen in FIG. 3a, the inwardly facing side of the second base plate 90 may suitably be provided with another guide 98, the purpose of which is to guide the first movable plate 30. The guide 98 is here illustrated as an elongated block portion which fits into a notch 38 (or guide-following recess) extending from the upper end of the first movable plate 30.

In the illustrated exemplary embodiment, when a user wishes to reduce the area of shadowing from the extended state of the sun visor 2, he/she simply pushes the first movable plate 30 upwards. A ledge 35 (see FIG. 3b) will push the third movable plates 70 back into place. If the user wishes to keep the second additional areas of shadowing, then he/she does not need to do anything, as they will not be affected by the upwards movement of the first movable plate 30. If the second additional areas of shadowing is perceived as superfluous, the user may simply push the second movable plates 50 in the respective length direction l back into the housing. Thus, it should be understood that the user may select if all or only parts of the movable plates should be pushed back into the housing.

From the above explanations and from the illustrated examples, it should now be clear that, in a general sense, according to at least one exemplary embodiment, the sun visor 2 has a non-extended state in which at least a major portion of the first movable plate 30 and a major portion of the at least one second and/or third movable plate 50, 70 are located within the housing, and an extended state in which the first movable plate 30 and the at least one second and/or third movable plate 50, 70 protrude out from the housing and smaller portions than said major portions remain in the housing.

In FIGS. 2a, 2b, 3a, 3b, 4a and 4b, the first base plate 10 and the second base plates 90 are illustrated as having circular depressions 15, 95. These circular depressions may represent magnets 15, 95 or cavities into which magnets may be placed. Thus, according to at least some exemplary embodiments, the first base plate 10 may be connected to the second base plate 90 by one or more magnets 15, 95.

It is to be understood that the present invention is not limited to the embodiments described above and illustrated in the drawings; rather, the skilled person will recognize that many changes and modifications may be made within the scope of the appended claims.

The invention claimed is:

1. An extendable sun visor for a vehicle, comprising:
a base plate for providing a base area of shadowing,
a first movable plate which is connected to the base plate and which is movable in relation to the base plate for providing a first additional area of shadowing,
at least one second movable plate which is connected to the base plate and which is movable in relation to both the base plate and the first movable plate for providing at least one second additional area of shadowing, the at least one second additional area of shadowing being different from the first additional area of shadowing, and
an actuating structure for actuating a movement of the at least one second movable plate when the first moveable plate is moved,
wherein the actuating structure comprises a first actuation surface provided on the first movable plate and a second actuation surface provided on the second movable plate, and
wherein the first actuation surface is configured to push the second actuation surface when the first movable plate is moved for providing the first additional area of shadowing.

2. The extendable sun visor of claim 1:
wherein the base plate extends in a length direction, a height direction, and a thickness direction,
wherein the length of the base plate is greater than the height, and the height of the base plate is greater than the thickness, and
wherein the first movable plate is movable in the height direction.

3. The extendable sun visor of claim 1, wherein the first movable plate is movable in a different direction than the at least one second movable plate.

4. The extendable sun visor of claim 1:
wherein the first movable plate has a main extension in a geometrical plane, and
wherein the first actuation surface extends at an angle to the geometrical plane.

5. The extendable sun visor of claim 4, wherein the second actuation surface extends at an angle to the geometrical plane.

6. The extendable sun of claim 5, wherein the first actuation surface and the second actuation surface extend diagonally with respect to a length direction and a height direction of the base plate.

7. The extendable sun visor of claim 6, wherein when the movement of the at least one second movable plate is actuated by the actuating structure, the at least one second movable plate moves in the length direction of the base plate for providing the at least one second additional area of shadowing.

8. The extendable sun visor of claim 7, wherein one of the at least one second movable plate and the base plate is provided with a guide extending in the length direction of the base plate, and the other one of the at least one second movable plate and the base plate is provided with a guide-following protrusion or recess which is configured to be guided in the length direction.

9. The extendable sun visor of claim 5, wherein the first actuation surface and second actuation surface extend in the length direction of the base plate.

10. The extendable sun visor of claim 9, wherein when the movement of the at least one second movable plate is actuated by the actuating structure, the at least one second movable plate moves diagonally with respect to the length direction and the height direction of the base plate for providing the at least one second additional area of shadowing.

11. The extendable sun visor of claim 10, wherein one of the at least one second movable plate and the base plate is provided with a guide extending diagonally relative to the length direction and the height direction of the base plate, and the other one of the at least one second movable plate and the base plate is provided with a guide-following protrusion or recess which is configured to be guided diagonally relative to the length direction and the height direction of the base plate.

12. The extendable sun visor of claim 1, wherein the sun visor further comprises:
at least one third movable plate for providing at least one third additional area of shadowing,
wherein the at least one third movable plate is caused to move when the first movable plate is moved to provide the first additional area of shadowing.

13. The extendable sun visor of claim 12, wherein the at least one second movable plate and the at least one third movable plate are configured to move at an angle relative to each other.

14. The extendable sun visor of claim 12:
wherein the at least one third movable plate comprises a pair of third movable plates adapted to protrude from opposite ends of the base plate for providing two additional third areas of shadowing, and
wherein the motions of the third movable plates are mirror symmetrical.

15. The extendable sun visor of claim 14:
wherein the height of the base plate extends from an upper end to a lower end thereof,
wherein the first movable plate is configured to move in the height direction pointing from the upper end to the lower end, and
wherein the pair of third movable plates are arranged at the upper end and configured to move in parallel with a main plane of the base plate and obliquely to the height direction of the base plate.

16. The extendable sun visor of claim 15:
wherein the at least one second movable plate comprises a pair of second movable plates,
wherein the second movable plates are adapted to protrude from opposite ends of the base plate for providing two additional second areas of shadowing, and
wherein the movements of the second movable plates are mirror symmetrical.

17. The extendable sun visor of claim 16, wherein the pair of second movable plates are arranged at the upper end and configured to move in opposite directions in parallel with the length direction of the base plate.

18. The extendable sun visor of claim 1:
wherein the base plate is a first base plate, and
wherein the sun visor further comprises a second base plate connected to and forming a housing with the first base plate, and
wherein the first movable plate and the at least one second movable plate are movably arranged in the housing.

19. The extendable sun visor of claim 12:
wherein the base plate is a first base plate,
wherein the sun visor further comprises a second base plate connected to and forming a housing with the first base plate, and
wherein the first movable plate and the at least one third movable plate are movably arranged in the housing.

20. The extendable sun visor of claim 18, wherein:
the sun visor further comprises at least one third movable plate for providing at least one third additional area of shadowing, and
the sun visor has a non-extended state in which at least a major portion of the first movable plate and a major portion of at least one of the at least one second and the third movable plate are located within the housing, and an extended state in which the first movable plate and the at least one of the at least one second and the third movable plate protrude out from the housing and smaller portions than the major portions remain in the housing.

21. The extendable sun visor of claim 18, wherein the first base plate is connected to the second base plate by one or more magnets.

22. The extendable sun visor of claim 21, wherein the one or more magnets are provided in depressions in at least one of the first base plate and the second base plate.

23. A vehicle comprising the extendable sun visor of claim 1.

24. An extendable sun visor for a vehicle, comprising:
a base plate for providing a base area of shadowing,
a first movable plate which is connected to the base plate and which is movable in relation to the base plate for providing a first additional area of shadowing,
at least one second movable plate which is connected to the base plate and which is movable in relation to both the base plate and the first movable plate for providing at least one second additional area of shadowing, the at least one second additional area of shadowing being different from the first additional area of shadowing, and
an actuating structure for actuating a movement of the at least one second movable plate when the first moveable plate is moved,
wherein the sun visor further comprises:
at least one third movable plate for providing at least one third additional area of shadowing,
wherein the at least one third movable plate is caused to move when the first movable plate is moved to provide the first additional area of shadowing,
wherein the at least one third movable plate comprises a pair of third movable plates adapted to protrude from opposite ends of the base plate for providing two additional third areas of shadowing,
wherein the motions of the third movable plates are mirror symmetrical,
wherein the height of the base plate extends from an upper end to a lower end thereof,
wherein the first movable plate is configured to move in the height direction pointing from the upper end to the lower end,
wherein the pair of third movable plates are arranged at the upper end and configured to move in parallel with a main plane of the base plate and obliquely to the height direction of the base plate,
wherein the at least one second movable plate comprises a pair of second movable plates,
wherein the second movable plates are adapted to protrude from opposite ends of the base plate for providing two additional second areas of shadowing,
wherein the movements of the second movable plates are mirror symmetrical, and
wherein the pair of second movable plates are arranged at the upper end and configured to move in opposite directions in parallel with the length direction of the base plate.

* * * * *